US012705830B2

(12) United States Patent
Lamba et al.

(10) Patent No.: US 12,705,830 B2
(45) Date of Patent: Aug. 11, 2026

(54) SIMPLIFIED ANNOTATION-FREE DOMAIN TRANSFER FOR FACIAL AVATARS

(71) Applicant: QUALCOMM Incorporated, San Diego, CA (US)

(72) Inventors: Mohit Lamba, New Delhi (IN); Anupama S, Chennai (IN); Avani Rao, Bangalore (IN); Srenivas Varadarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 18/891,358

(22) Filed: Sep. 20, 2024

(65) Prior Publication Data

US 2026/0087732 A1 Mar. 26, 2026

(51) Int. Cl.

| | |
|---|---|
| ***G06T 17/00*** | (2006.01) |
| ***G06T 11/00*** | (2026.01) |
| ***G06V 10/25*** | (2022.01) |
| ***G06V 10/44*** | (2022.01) |
| ***G06V 10/75*** | (2022.01) |

(52) U.S. Cl.

CPC .............. *G06T 17/00* (2013.01); *G06T 11/00* (2013.01); *G06V 10/25* (2022.01); *G06V 10/44* (2022.01); *G06V 10/751* (2022.01)

(58) Field of Classification Search

None

See application file for complete search history.

(56) References Cited

U.S. PATENT DOCUMENTS

| | | | | |
|---|---|---|---|---|
| 2019/0244107 | A1* | 8/2019 | Murez | G06N 3/08 |
| 2022/0108134 | A1* | 4/2022 | Marrero | G06F 18/2148 |
| 2022/0391768 | A1* | 12/2022 | Li | G06F 17/18 |

* cited by examiner

*Primary Examiner* — Nicholas R Wilson

(74) *Attorney, Agent, or Firm* — Polsinelli LLP/QUALCOMM Incorporated

(57) ABSTRACT

Techniques and systems are described for image generation. For instance, a process can include obtaining a first image, wherein the first image is associated with a first image domain; converting, using a machine learning (ML) model, the first image into a second image domain to generate a second image; generating a first set of domain agnostic features for the first image; generating a second set of domain agnostic features for the second image; determining a loss value based on a comparison of the first set of domain agnostic features and the second set of domain agnostic features; and adjusting the ML model based on the loss value. The process can further include generating a third image in the second image domain based the adjusted ML model (e.g., based on an additional image in the first image domain using the adjusted/trained ML model).

20 Claims, 10 Drawing Sheets

SIMPLIFIED ANNOTATION-FREE DOMAIN TRANSFER FOR FACIAL AVATARS

FIELD

This application is related to content for extended reality (XR) systems. For example, aspects of the application relate to systems and techniques for a simplified, annotation-free, domain transfer for facial avatars for XR applications.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto images of a real-world environment, which can be viewed by a user through an XR device (e.g., a head-mounted display (HMD), extended reality glasses, or other device). For example, an XR device can display an environment to a user. The environment is at least partially different from the real-world environment in which the user is in. The user can generally change their view of the environment interactively, for example by tilting or moving the XR device (e.g., the HMD or other device).

An XR system can include a "see-through" display that allows the user to see their real-world environment based on light from the real-world environment passing through the display. In some cases, an XR system can include a "pass-through" display that allows the user to see their real-world environment, or a virtual environment based on their real-world environment, based on a view of the environment being captured by one or more cameras and displayed on the display. "See-through" or "pass-through" XR systems can be worn by users while the users are engaged in activities in their real-world environment.

In some cases, XR systems may be used to enhance experiences, such as for telepresence, gaming, metaverse, etc. Such technologies may allow a person to perform actions and/or have experiences, such as a collaborative and/or interactive experience with other persons, at a remote and/or virtual locations. In some cases, users may be represented in a virtual space as an animated avatar which may mimic movements and/or expressions of their representative user. A particular user may view the remote/virtual locations from a perspective of the avatar, for example, via an XR display device, such as a head mounted display (HMD) or mobile device. A precise reconstruction of a user's face for the avatar may allow for a more seamless, high quality, experience. In some cases, techniques for mesh estimation using HMD images may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In some aspects, an augmented reality apparatus is provided. The apparatus includes a memory; and at least one processor coupled to the memory. The at least one processor is configured to: obtain a first image, wherein the first image is associated with a first image domain; convert, using a machine learning (ML) model, the first image into a second image domain to generate a second image; generate a first set of domain agnostic features for the first image; generate a second set of domain agnostic features for the second image; determine a loss value based on a comparison of the first set of domain agnostic features and the second set of domain agnostic features; adjust the ML model based on the loss value; and generate a third image in the second image domain based on the adjusted ML model.

In some aspects, a method for generating an image is provided. The method includes: obtaining a first image, wherein the first image is associated with a first image domain; converting, using a machine learning (ML) model, the first image into a second image domain to generate a second image; generating a first set of domain agnostic features for the first image; generating a second set of domain agnostic features for the second image; determining a loss value based on a comparison of the first set of domain agnostic features and the second set of domain agnostic features; adjusting the ML model based on the loss value; and generating a third image in the second image domain based on the adjusted ML model.

In another example, a non-transitory computer-readable medium having stored thereon instructions is provided. The instructions, when executed by at least one processor, cause the at least one processor to: obtain a first image, wherein the first image is associated with a first image domain; convert, using a machine learning (ML) model, the first image into a second image domain to generate a second image; generate a first set of domain agnostic features for the first image; generate a second set of domain agnostic features for the second image; determine a loss value based on a comparison of the first set of domain agnostic features and the second set of domain agnostic features; adjust the ML model based on the loss value; and generate a third image in the second image domain based on the adjusted ML model.

As another example, an apparatus for generating an image is provided. The apparatus includes: means for obtaining a first image, wherein the first image is associated with a first image domain; means for converting, using a machine learning (ML) model, the first image into a second image domain to generate a second image; generating a first set of domain agnostic features for the first image; means for generating a second set of domain agnostic features for the second image; means for determining a loss value based on a comparison of the first set of domain agnostic features and the second set of domain agnostic features; means for adjusting the ML model based on the loss value; and means for generating a third image in the second image domain based on the adjusted ML model.

In some aspects, the apparatus can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
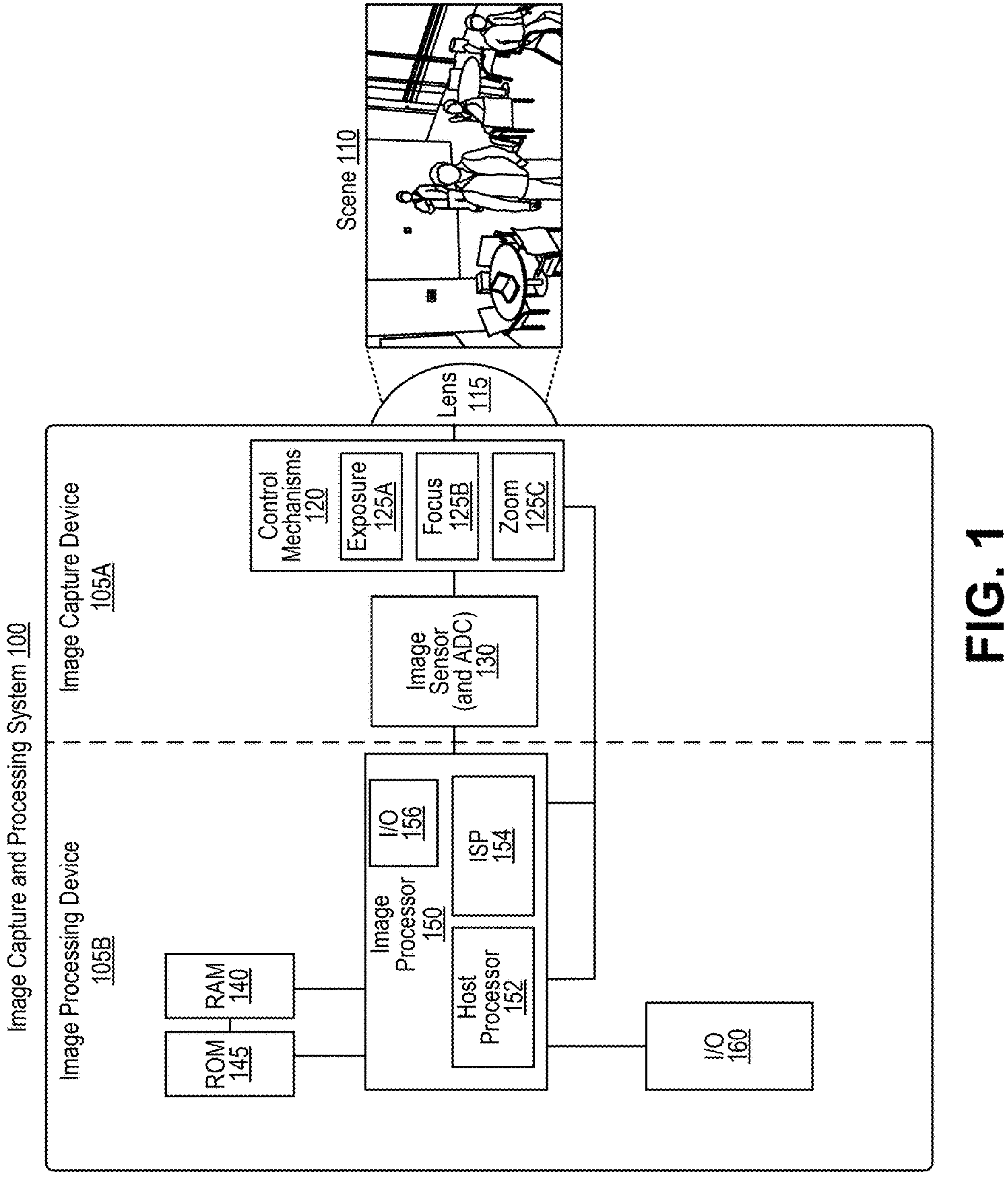
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, a user may be represented in a virtual environment by an avatar for the user. To enhance immersion into the virtual environment, the avatar may be configured with a face that may reflect expressions of the user. In some cases, the avatar may be generated based on a mesh model created based on images of the user. Traditionally, the images of the user used to generate the 3DMM have an unobstructed, frontal, and color (e.g., RGB) view of the face of the user. However, HMD devices may use near-infrared (NIR) cameras (e.g., within the HMD device), to capture images of a portion of the face. These NIR images can differ from color images (e.g., RGB images) and may not be compatible with models trained on RGB images. Additionally, 3DMMs may have been generated using previously captured images and NIR versions of the previously captured images may not be available.

In some cases, color images may be transformed into simulated NIR images for training. For example, NIR images of a user from inward facing cameras of the HMD device may be used to train one or more ML models to generate a facial image or 3D model, for example, to be used for an avatar of the user. In some cases, it may be difficult/expensive to obtain an NIR dataset for training one or more ML models to generate a facial image or 3D model. For example, NIR images may be annotated for such training and adding annotations or other metadata can be expensive, especially if there are existing dataset (or a dataset that can be relatively cheaply generated) for color images which includes the metadata.

However, transforming color images from one image domain (e.g., RGB domain) to another image domain (e.g., NIR domain) can be challenging. For example, camera intrinsic properties, camera extrinsic properties, camera pose, background lighting, an appearance of a user's clothing, geometric distortion from wearing an HMD vs images captured without an HMD, etc., may all differ between the two image domains. Additionally, there may be expression drift due to, for example, artifacts from the domain conversion. In some cases, improved techniques for converting images across image domains, such as from the RGB domain to NIR domain may be useful.

Systems, apparatuses, electronic devices, methods (also referred to as processes), and computer-readable media (collectively referred to herein as "systems and techniques") are described herein for training an ML model to generate images. For example, a ML model may be trained to receive a first image from one image domain, such as an RGB domain, and to convert the first image to a second image domain to generate a second image. A first set of domain agnostic features may be generated from the first image and a second set of domain agnostic features may be generated from the second image. The domain agnostic features may be features (e.g., geometric details) of the face that may be present across image domains. A loss value, such as geometry preservation loss value may then be determined based on a comparison between the first set of domain agnostic features and the second set of domain agnostic features. The ML model may be trained based on the loss value.

As the loss value may indicate a difference in geometric feature content between, for example, the first image and the second image, it may be useful to isolate the loss value such that the loss value is determined over an area that matters, such as for a foreground area corresponding with a face rather than a background area. In some cases, a region of interest may be determined based on the first image. The ROI may be determined based on portions of the image that are in the foreground of the image. In some cases, the portions of the image that are in the foreground may be determined based on depth buffer information from rendering the first image. For example, portions of a 3D model used to render the first image (e.g., that are included int eh first image) may be part of the foreground and portions of the first image which do not include portions of the 3D model may be part of the background. In some cases, weights for pixels of the ROI may also be determined. The weights may represent portions of the ROI which have a greater degree of freedom and may therefore be more expressive, such as the lips or eyes.

Various aspects of the application will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 9:
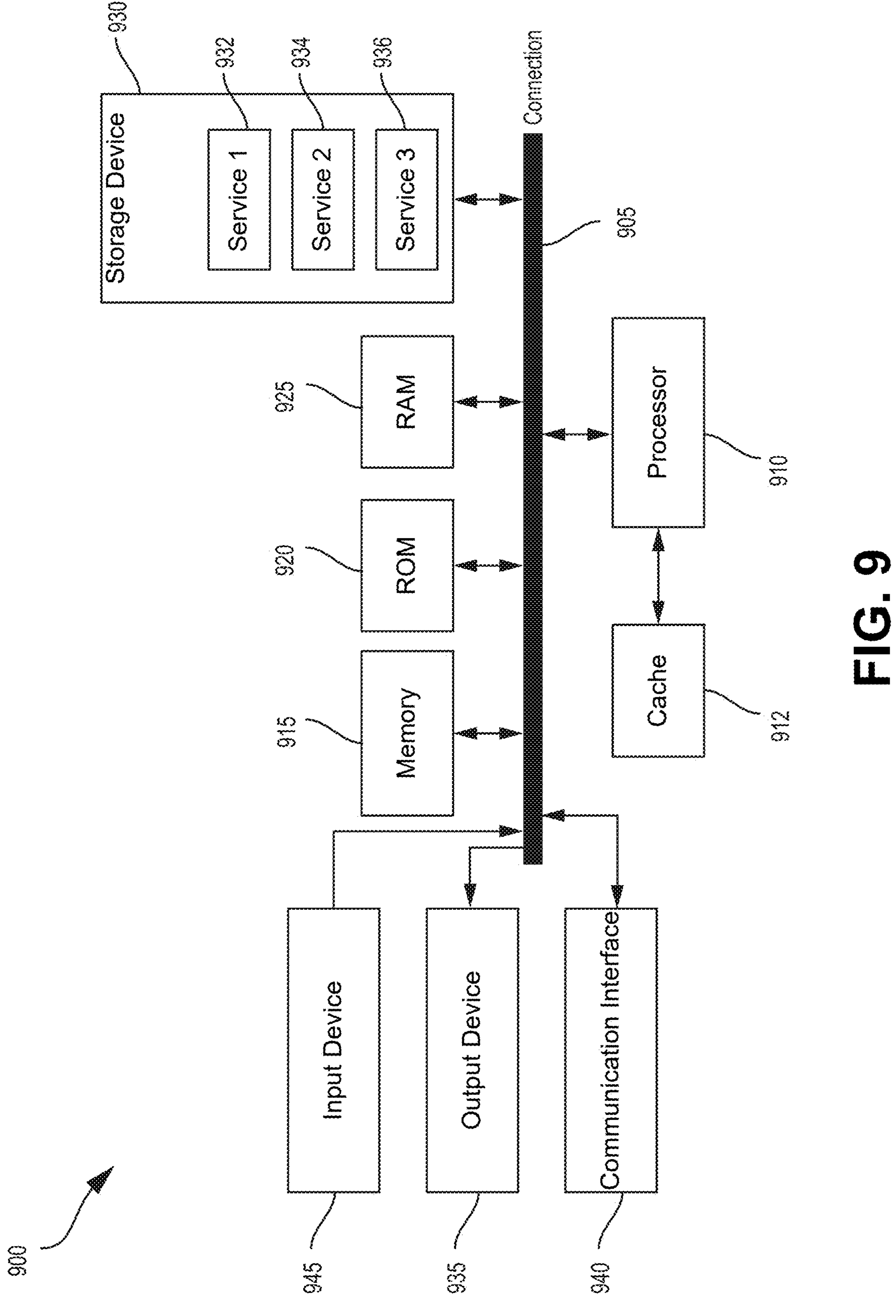
FIG. 9 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 910 discussed with respect to the computing system 900 of FIG. 9. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1125, read-only memory (ROM) 145/1120, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
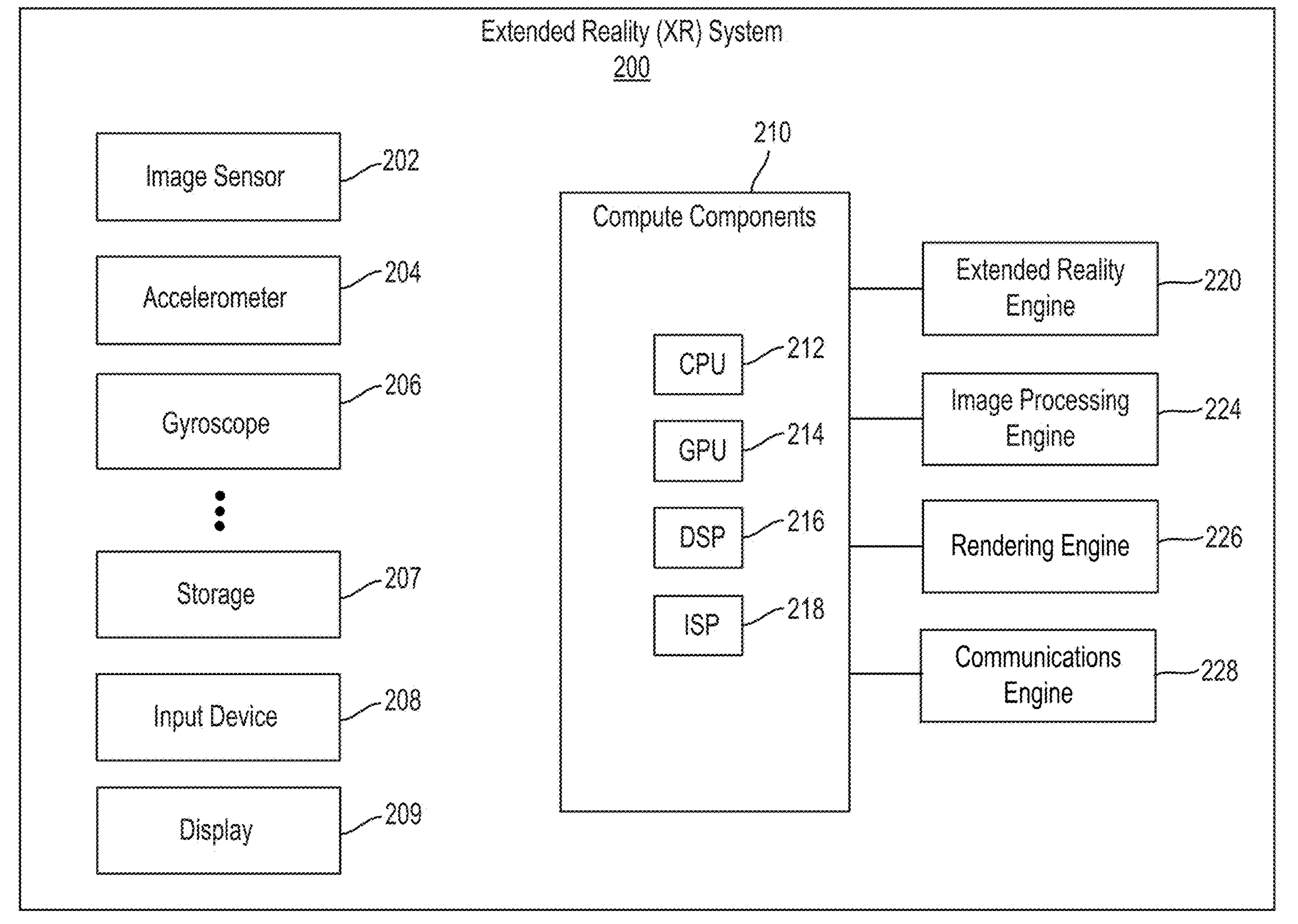
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2.

For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1145 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 940 of FIG. 9.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

A neural network is an example of a machine learning system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 3A-FIG. 4.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
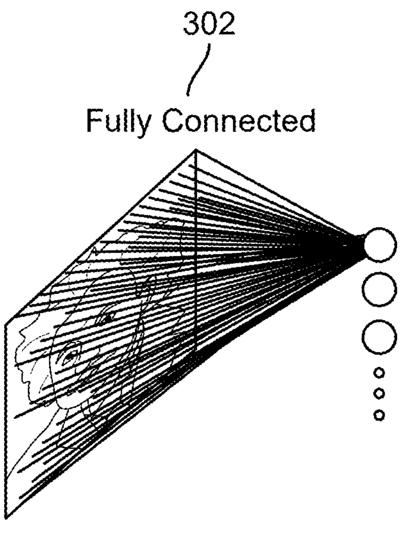
FIG. 3A-3D and FIG. 4 are diagrams illustrating examples of neural networks, in accordance with some examples.
Figure 3B:
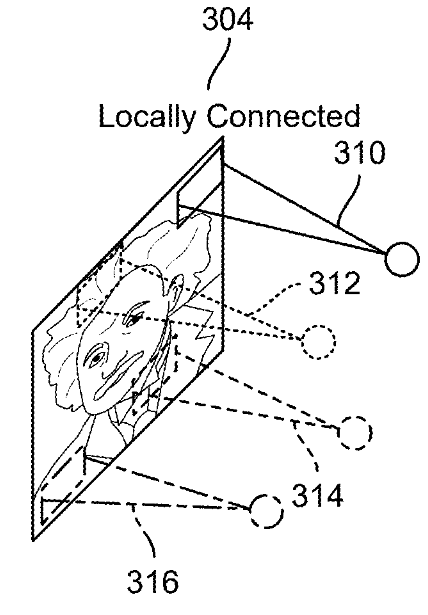

The connections between layers of a neural network may be fully connected or locally connected. FIG. 3A illustrates an example of a fully connected neural network 302. In a fully connected neural network 302, a neuron in a first layer may communicate its output to every neuron in a second layer, so that each neuron in the second layer will receive input from every neuron in the first layer. FIG. 3B illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Figure 3C:
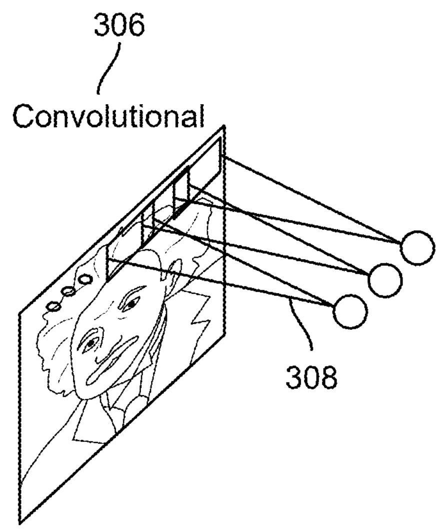

One example of a locally connected neural network is a convolutional neural network. FIG. 3C illustrates an example of a convolutional neural network 306. The convolutional neural network 306 may be configured such that the connection strengths associated with the inputs for each neuron in the second layer are shared (e.g., 308). Convolutional neural networks may be well suited to problems in which the spatial location of inputs is meaningful. Convolutional neural network 306 may be used to perform one or more aspects of video compression and/or decompression, according to aspects of the present disclosure.

Figure 3D:
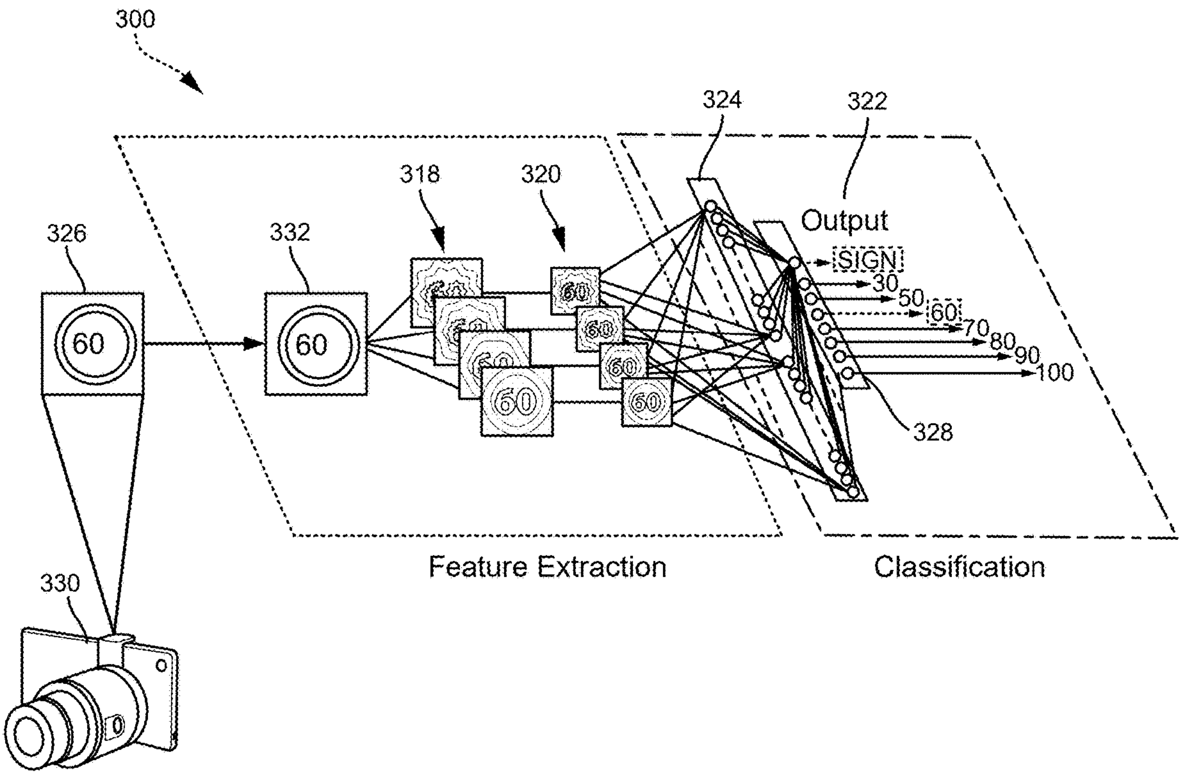

One type of convolutional neural network is a deep convolutional network (DCN). FIG. 3D illustrates a detailed example of a DCN 300 designed to recognize visual features from an image 326 input from an image capturing device 330.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory consumption. The second set of feature maps 320 may be further convolved via one or more subsequent convolutional layers (not shown) to generate one or more subsequent sets of feature maps (not shown).

In the example of FIG. 3D, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the others of the output 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 320) receiving input from a range of neurons in the previous layer (e.g., feature maps 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 4:
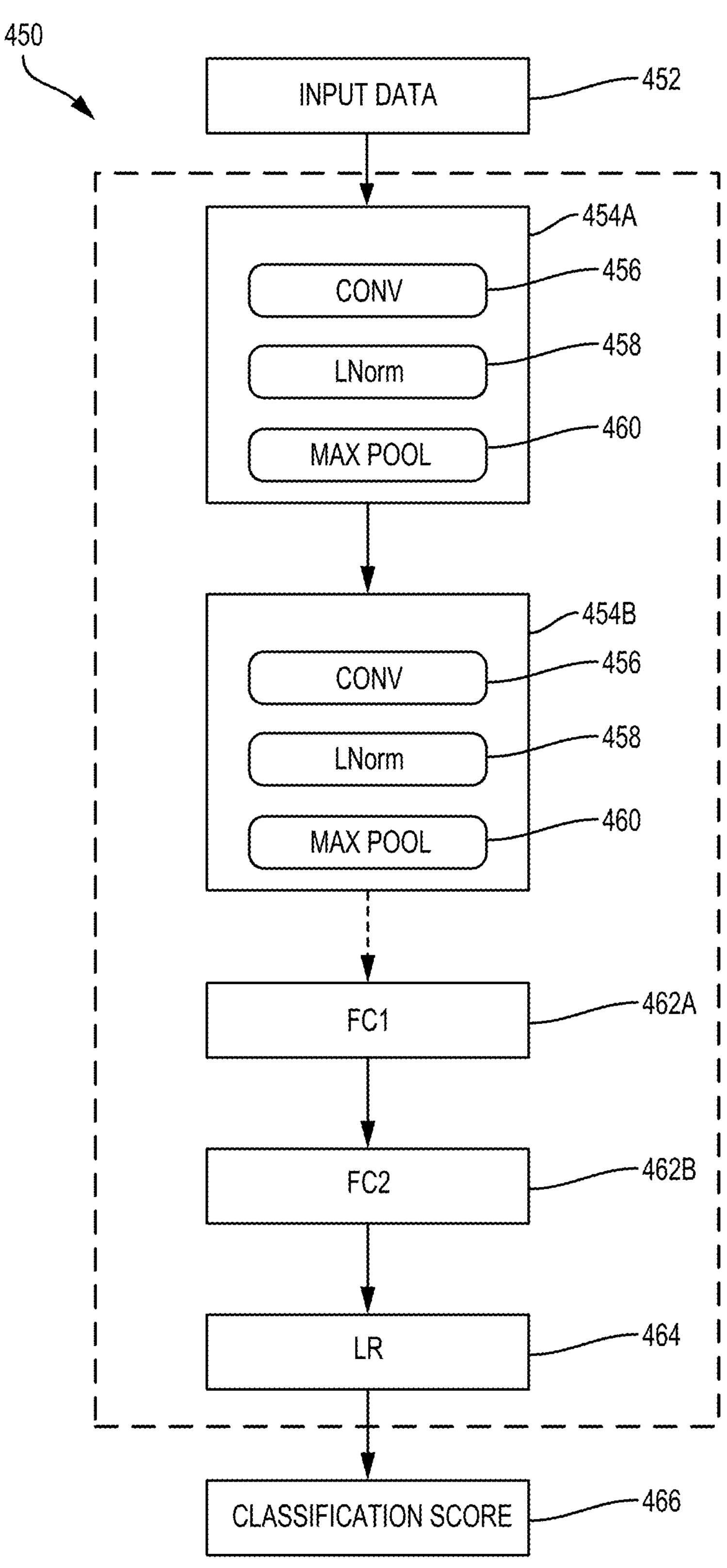

FIG. 4 is a block diagram illustrating an example of a deep convolutional network 450. The deep convolutional network 450 may include multiple different types of layers based on connectivity and weight sharing. As shown in FIG. 4, the deep convolutional network 450 includes the convolution blocks 454A, 454B. Each of the convolution blocks 454A, 454B may be configured with a convolution layer (CONV) 456, a normalization layer (LNorm) 458, and a max pooling layer (MAX POOL) 460.

The convolution layers 456 may include one or more convolutional filters, which may be applied to the input data 452 to generate a feature map. Although only two convolution blocks 454A, 454B are shown, the present disclosure is not so limiting, and instead, any number of convolution blocks (e.g., convolution blocks 454A, 454B) may be included in the deep convolutional network 450 according to design preference. The normalization layer 458 may normalize the output of the convolution filters. For example, the normalization layer 458 may provide whitening or lateral inhibition. The max pooling layer 460 may provide down sampling aggregation over space for local invariance and dimensionality reduction.

The parallel filter banks, for example, of a deep convolutional network may be loaded on a CPU 212 or GPU 214 of the compute components 210 to achieve high performance and low power consumption. In alternative aspects, the parallel filter banks may be loaded on the DSP 216 or an ISP 218 of an the compute components 210. In addition, the deep convolutional network 450 may access other processing blocks that may be present on the compute components 210, such as sensor processor and navigation module, dedicated, respectively, to sensors and navigation.

The deep convolutional network 450 may also include one or more fully connected layers, such as layer 462A (labeled "FC1") and layer 462B (labeled "FC2"). The deep convolutional network 450 may further include a logistic regression (LR) layer 464. Between each layer 456, 458, 460, 462A, 462B, 464 of the deep convolutional network 450 are weights (not shown) that are to be updated. The output of each of the layers (e.g., 456, 458, 460, 462A, 462B, 464) may serve as an input of a succeeding one of the layers (e.g., 456, 458, 460, 462A, 462B, 464) in the deep convolutional network 450 to learn hierarchical feature representations from input data 452 (e.g., images, audio, video, sensor data and/or other input data) supplied at the first of the convolution blocks 454A. The output of the deep convolutional network 450 is a classification score 466 for the input data 452. The classification score 466 may be a set of probabilities, where each probability is the probability of the input data including a feature from a set of features.

Figure 5A:
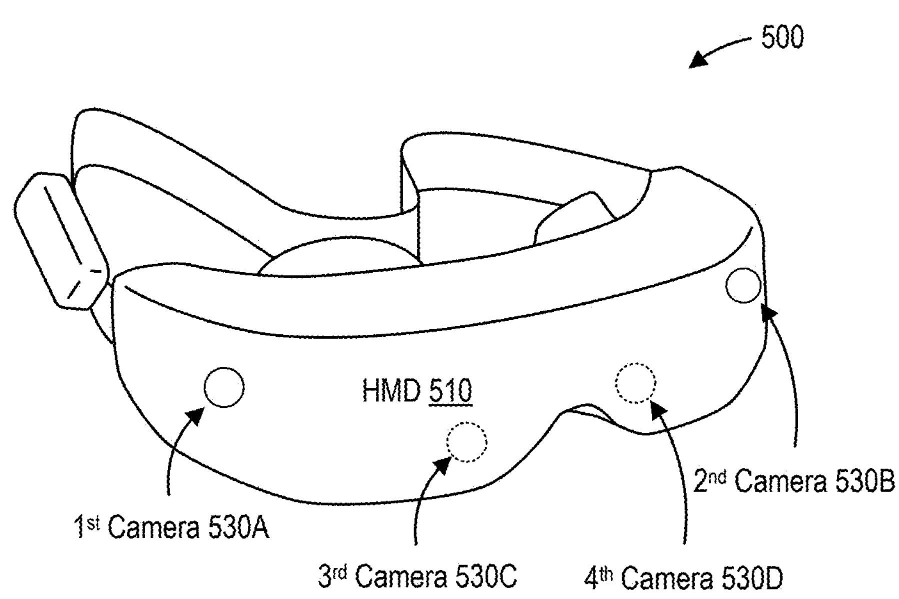
FIG. 5A is a perspective diagram illustrating a head-mounted display (HMD), in accordance with some examples.

FIG. 5A is a perspective diagram 500 illustrating a head-mounted display (HMD) 510, in accordance with some examples. The HMD 510 may be, for example, an augmented reality (AR) headset, a virtual reality (VR) headset, a mixed reality (MR) headset, an extended reality (XR) headset, or some combination thereof. The HMD 510 may be an example of an XR system 200, a SLAM system, or a combination thereof. The HMD 510 includes a first camera 530A and a second camera 530B along a front portion of the HMD 510 which are outward facing (e.g., to capture images of the environment around the HMD 510). In some examples, the HMD 510 may only have a single outward facing camera. In some examples, the HMD 510 may include one or more additional outward facing cameras in addition to the first camera 530A and the second camera 530B. The HMD 510 includes a third camera 530C and fourth camera 530D, which are inward facing to capture images of portions of the face of a user of the HMD 510 that may be covered by the HMD 510. In some examples, the HMD 510 may include one or more additional sensors in addition to the cameras.

Figure 5B:
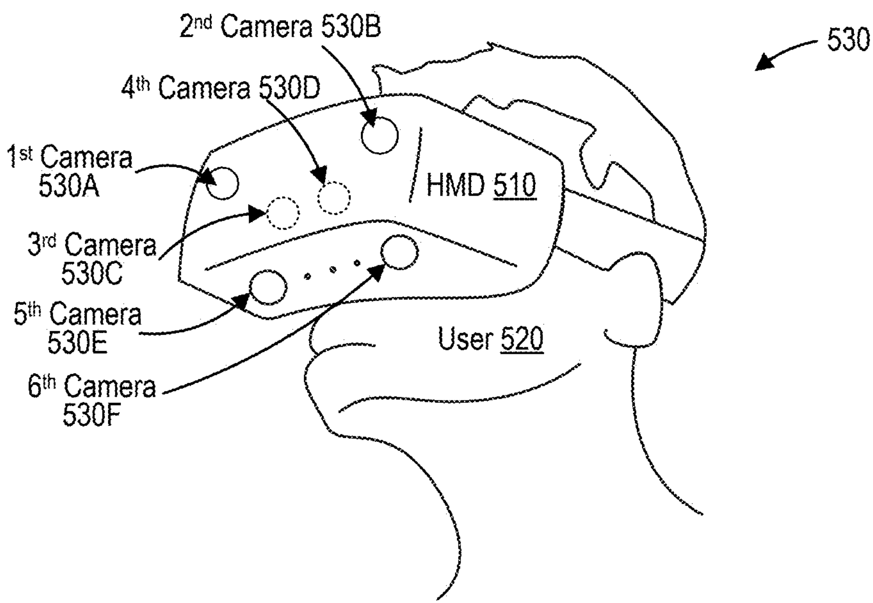
FIG. 5B is a perspective diagram illustrating the HMD of FIG. 5A, in accordance with some examples.

FIG. 5B is a perspective diagram 530 illustrating the head-mounted display (HMD) 510 of FIG. 5A being worn by a user 520, in accordance with some examples. The user 520 wears the HMD 510 on the user 520's head over the user 520's eyes. The HMD 510 can capture images of the environment with the first camera 530A and the second camera 530B. In some examples, the HMD 510 displays one or more display images toward the user 520's eyes that are based on the images captured by the first camera 530A and the second camera 530B. The display images may provide a stereoscopic view of the environment, in some cases with information overlaid and/or with other modifications. For example, the HMD 510 can display a first display image to the user 520's right eye, the first display image based on an image captured by the first camera 530A. The HMD 510 can display a second display image to the user 520's left eye, the second display image based on an image captured by the second camera 530B. For instance, the HMD 510 may provide overlaid information in the display images overlaid over the images captured by the first camera 530A and the second camera 530B.

The HMD 510 can also capture images of portions of the face of the user that may be covered by the HMD 510 using the third camera 530C and fourth 530D. The HMD 510 can also capture images of portions of the face of the user below the HMD 510 device (e.g., a region of the face around the lips, lower cheeks, etc.) using a fifth camera 530E and a sixth camera 530F. In some cases, a single camera may be used in place of the fifth camera 530E and a sixth camera 530F.

The HMD 510 may include no wheels, propellers or other conveyance of its own. Instead, the HMD 510 relies on the movements of the user 520 to move the HMD 510 about the environment. In some cases, for instance where the HMD 510 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. Even if an environment is virtual, SLAM techniques may still be valuable, as the virtual environment can be unmapped and/or may have been generated by a device other than the HMD 510, such as a remote server or console associated with a video game or video game platform.

In some cases, a virtual representation (e.g., avatar) of a user in a virtual environment may be generated based on a mesh. In some cases, one or more meshes (e.g., including a plurality of vertices, edges, and/or faces in three-dimensional space) with corresponding materials may be used to represent an avatar. The materials may include one or more textures such as a normal texture, a diffuse or albedo texture, a specular reflection texture, any combination thereof, and/or other materials or textures. In some cases, a parametric 3D morphological model (3DMM) may be generated based on images of a user. A parametric 3DMM may be a mesh model (e.g., of a face) that has a predefined topology that may be deformed based on vector values (e.g., parameters). Traditionally, the images of the user used to generate the 3DMM have an unobstructed, frontal, and color (e.g., RGB) view of the face of the user. However, HMD devices may use near-infrared (NIR) cameras (e.g., within the HMD device), to capture images of a portion of the face. These NIR images can differ from color images (e.g., RGB images) and may not be compatible with models trained on RGB images. Additionally, 3DMMs may have been generated using previously captured images and NIR versions of the previously captured images may not be available.

In some cases, color images may be transformed into simulated NIR images for training. For example, NIR images of a user from inward facing cameras of the HMD device may be used to train one or more ML models to generate a facial image or 3D model, for example, to be used for an avatar of the user. In some cases, it may be difficult/expensive to obtain an NIR dataset for training one or more ML models to generate a facial image or 3D model. For example, NIR images may be annotated for such training and adding annotations or other metadata can be expensive, especially if there are existing dataset (or a dataset that can be relatively cheaply generated) for color images which includes the metadata.

Figure 6:
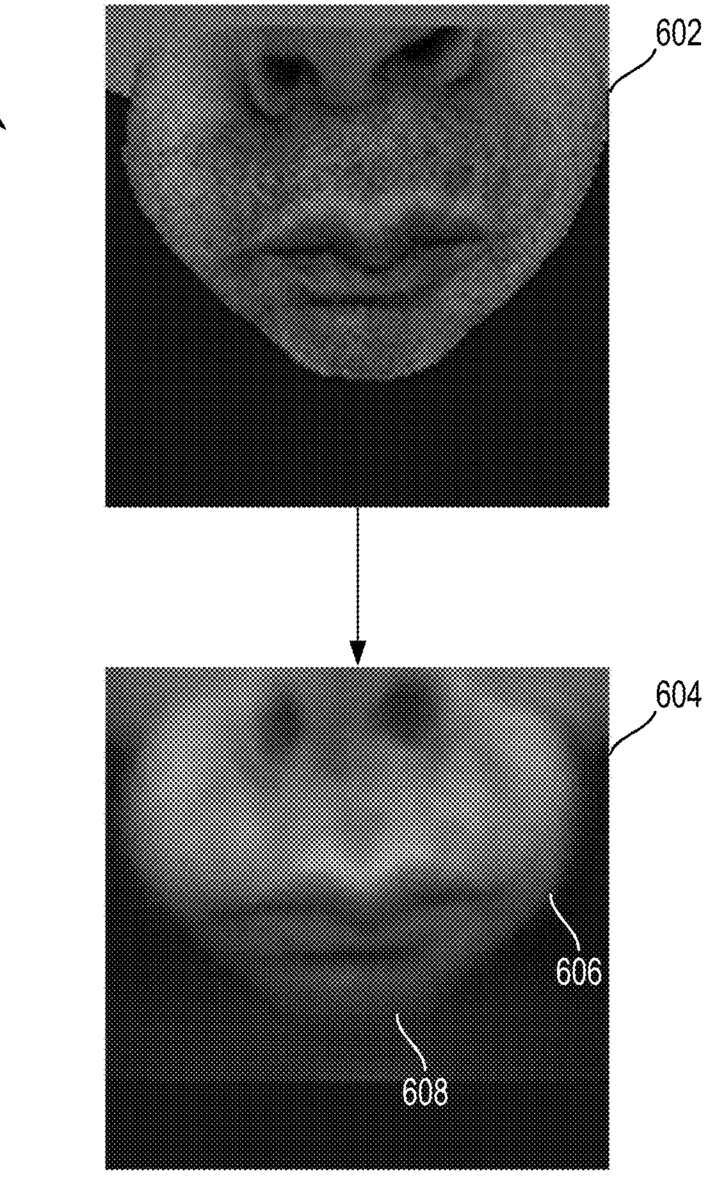
FIG. 6 illustrates images from different image domains, in accordance with some examples.

However, transforming color images from one image domain (e.g., RGB domain) to another image domain (e.g., NIR domain) can be challenging. In some cases, camera intrinsic properties, camera extrinsic properties, camera pose, background lighting, an appearance of a user's clothing, geometric distortion from wearing an HMD vs images captured without an HMD, etc., may all differ between the two image domains. For example, as shown in FIG. 6, when a color image 602 of a face of the user is transformed into a NIR image 604, the NIR image 604 may be blurry and/or soften, resulting in an overall loss of. Additionally, there may be expression drift due to, for example, artifacts resulting in a narrower appearing cheek 606 area, distorted chin 608, etc. In some cases, improved techniques for converting images across domains, such as from the RGB domain to NIR domain may be useful. In some cases, an image domain may refer to properties of light represented by an image. Differences between images captured in different image domains my arise due to, for example, differences in the electromagnetic spectrum of the light being captured for the image, differences in camera specifications, differences in environmental settings under which the images were captures, camera placement, any combination thereof, and/or due to other factors. Of note, while discussed in the context of converting images from an RGB domain to an NIR domain, the techniques discussed herein may be applicable to conversions across other domains as well, such as for colorization of greyscale images.

Figure 7:
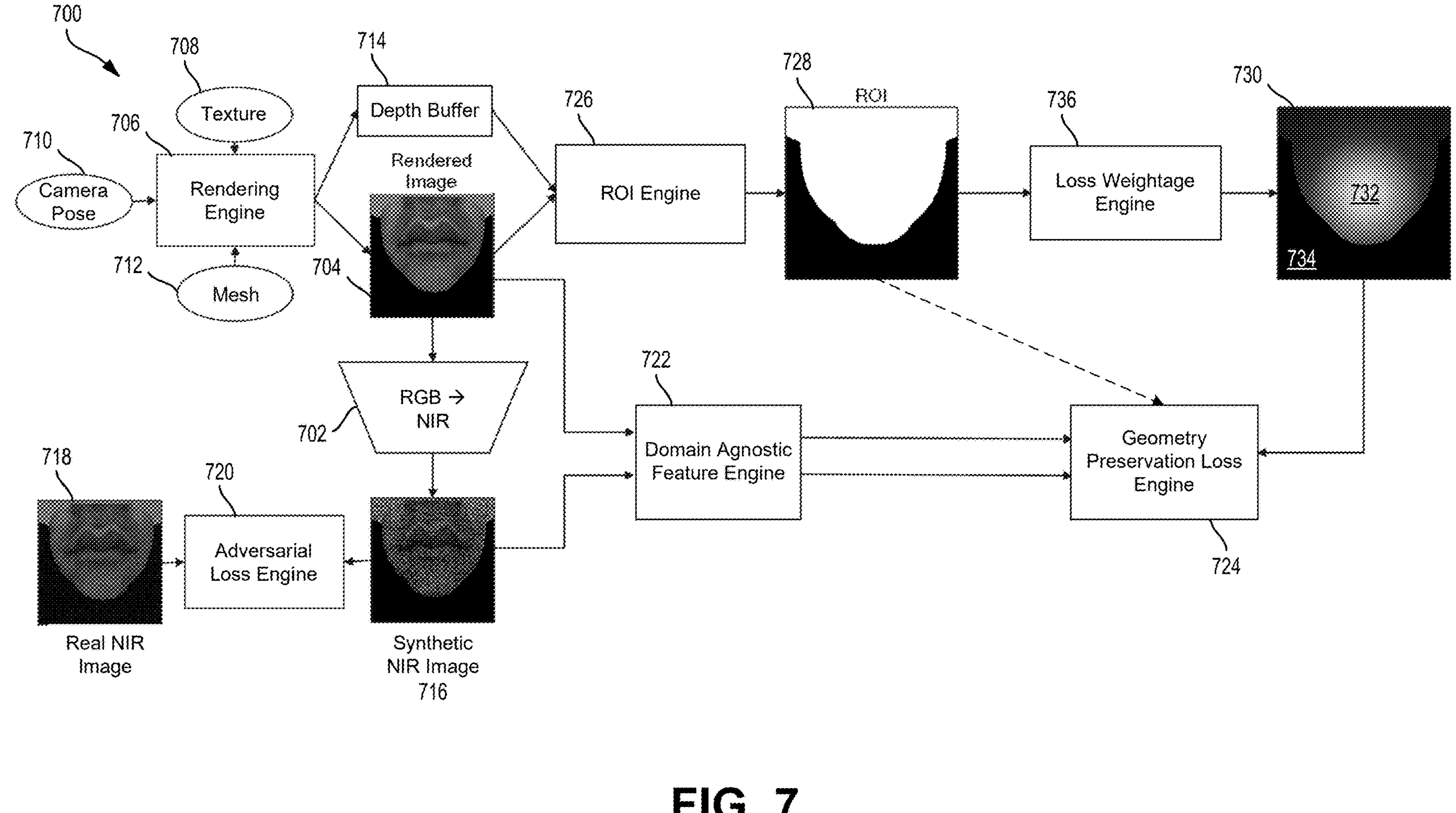
FIG. 7 is a block diagram illustrating a technique for an annotation-free domain transfer, in accordance with aspects of the present disclosure.

FIG. 7 is a block diagram illustrating a technique for an annotation-free domain transfer 700, in accordance with aspects of the present disclosure. In some cases, a ML based image domain convertor 702 may be trained to convert images (e.g., RGB images) from a color domain (e.g., RGB) to images (e.g., NIR images) of another domain, such as an NIR domain) using RGB rendered images 704. In some cases, the RGB rendered images 704 may be rendered by a rendering engine 706 (e.g., implementing rendering software) based on an RGB texture 708 of a face, camera pose information 710, and a 3D mesh model 712. For example, multiple RGB images of a person's face and/or head may be captured as a part of a training or a registration process and those multiple images may be used to generate the RGB texture 708 for their face/head using, for example, the camera pose information 710 for capturing the multiple RGB images. This RGB texture 708 may be fitted to the 3D mesh model 712, for example, by the rendering engine 706. In some cases, the 3D mesh model 712 may also be fitted with a mesh model of the HMD.

Based on the 3D mesh model 712 fitted with the HMD, the RGB rendered images 704 may be generated. For example, 3D rendering techniques may be used to render the RGB rendered images 704 of the textured 3D mesh model 712 from expected placement(s) of the inward facing cameras (e.g., third camera 530C, fourth camera 530D, fifth camera 530E, sixth camera 530F of FIGS. 5A and 5B) of the HMD. Examples of 3D rendering techniques may include Blender, PyTorch3D, etc. The RGB rendered images 704 may be generated based on known locations (e.g., placements) and orientations of the inward facing cameras of the HMD device. Additionally, depth buffer information 714 may also be generated. The depth buffer information 714 may indicate how far a particular point (e.g., pixel) of the 3D mesh model 712 is from a virtual camera viewpoint from where the RGB rendered images 704 is being rendered from.

In some cases, the RGB rendered images 704 may be passed to the image domain converter 702 to generate synthetic NIR images 716 from the RGB rendered images 704. In some cases, the synthetic NIR images 716 may be compared to real NIR images 718 to generate an adversarial loss by an adversarial loss engine 720 based on differences between the synthetic NIR images 716 and the real NIR images 718. A "real" image (e.g., a real NIR image) is an image captured by an actual sensor (e.g., a camera, an NIR sensor, etc.), whereas a "synthetic" image (e.g., a synthetic NIR image) is generated by the image domain converter 702. In some cases, there may not be a one-to-one pairing between synthetic NIR images 716 and real NIR images 718 and thus a synthetic NIR image 716 (and corresponding RGB rendered image 704) may not correspond directly with a real NIR image 718 being compared. For example, the multiple images used to generate the RGB texture 708 may have been previously taken (e.g., possibly years in the past) and the real NIR images 718 may be taken more recently, and the images may or may not be based on the same person(s).

In such cases, an adversarial loss, such as one used for training a generative adversarial network (GaN) may be determined. In a GaN, a generator ML model, here the image domain converter 702, may generate the synthetic NIR images 716, which may be fed, along with the real NIR images 718, to a discriminator ML model which attempts to distinguish between the synthetic NIR images 716 and real NIR images 718 to predict which images a real NIR image. The adversarial loss generated by the adversarial loss engine 720 may be determined to help improve the synthetic NIR images 716 generated by the image domain converter 702.

However, absent a direct loss as between the two domains (e.g., RBG domain and NIR domain), geometry preservation for geometric features of the face may be lost as there may not be a one-to-one match as between the synthetic NIR images 716 and real NIR images 718. Additionally, as there may not be a background for the synthetic NIR images 716, whereas a background may be visible in real NIR images, making it difficult to enforce geometry preservation. This geometry preservation may be associated with content that are contradictory and/or dissimilar as between the synthetic NIR images 716 and the real NIR images 718. However, enforcing a direct loss via domain agnostic features between the two domains may be useful for geometry preservation. In some cases, the domain agnostic features may be features (e.g., geometric details) of the face that may be present across image domains.

In some cases, a direct loss between the two domains may be determined based on a comparison of domain agnostic features from a first image domain with domain agnostic features from a second image domain. In some cases, the RGB rendered image 704 and the synthetic NIR image 716 may be passed to a domain agnostic feature engine 722. The domain agnostic feature engine 722 may determine the domain agnostic features. In some cases, to determine the domain agnostic features, an input image I, where $I \in \{D_A, D_B\}$, and $D_A$ and $D_B$ represent different image domains (e.g., $D_A$ representing the RGB domain and $D_B$ representing the NIR domain) may be pre-processed to obtain pre-processed image p by filtering the image I to enhance the pertinent features (e.g., geometric cues). In some cases, the image/ may be filtered such that p=f(I), where f represents an application that may vary. Examples of the application f may include an edge detector, a Y channel of YCrCb space for disentangling intensity from color, etc.

The pre-processed image p may then be then passed through a visual geometry group (VGG) network, V having L layers and subjected to a post-processing step of per channel mean subtraction, such that $p_i \in f(D_i)$ for $i \in [A, B]$ and $$p_i^l$$

denote the activation of the lth layer of V. Then, $$q_i^l[Ch, H, W] = p_i^l[Ch, H, W] - \frac{\sum_{H,W} p_i^l[Ch, H, W]}{H \cdot W},$$

where H, W denote the spatial coordinates and Ch the channels. Of note, while VGG is discussed herein it may be understood that other ML models may be used to select the model V. For example, a 3DMM network which accepts facial images and maps them into a latent code encapsulating the geometric features of the face may be used. In such a case, the latent code acts as the domain agnostic representation.

A classification network $C_l$ may then be trained such that for each layer of V, $C_l$ may distinguish between source domains of $$q_A^l \text{ and } q_B^l.$$

This may be expressed as f or $l \in [1, L]$: Train classifier $C_l$ for classifying $$q_A^l \text{ and } q_B^l.$$

Classifiers which achieve an accuracy lower than a threshold may indicate suitable layers for domain agnostic representation. Since more than one such layer exists, the layer having the highest resolution may be chosen. Concretely, $$l^* = \operatorname{argmax}\left[r\left(q_A^l\right)\right] \forall \text{ accuracy}(C_l) < \tau,$$

where r(•) denotes the layer resolution. After l* is identified, the domain agnostic features for image/may be determined using $F(I)=q^{l*}$.

After domain agnostic features are identified for the RGB rendered image 704 and the synthetic NIR image 716 by the domain agnostic feature engine 722, the domain agnostic features may be passed to a geometry preservation loss engine 724. The geometry preservation loss engine 724 may then determine a geometry preservation loss based on a difference between the domain agnostic features F for the RGB rendered image 704 and the synthetic NIR image 716. For example, the geometry preserving loss L as being images $I^A$ and $I^B$ of two domains may be determined in in the domain agnostic space F(•) as $L=\Sigma_{xy} W_{xy} \sim \|F(I^A)-F(I^B)\|$, where $$W_{xy} = \begin{cases} G_{xy}, & ROI_{xy} = \text{Foreground} \\ 0, & ROI_{xy} = \text{Background} \end{cases}.$$

The geometry preservation loss may be used to train the image domain converter 702.

The geometry preservation loss may indicate a difference in geometric feature content between the RGB rendered image 704 and the synthetic NIR image 716. As indicated above, synthetic NIR images 716 may not have a background while real NIR images 718 may have a background. In some cases, the synthetic NIR images 716 may not have a background, for example because the synthetic NIR images 716 may be derived from RGB rendered images 704 that do not include the background (e.g., it may not be possible to capture all possible backgrounds and lighting conditions, and attempting to do so may add additional training issues if the losses include differences based on the background). As the background may not contribute to geometric features of the face, and it may be more useful to generate the geometry preservation loss over a region of interest (ROI) where the ROI encompasses the face. In some cases, an ROI may be determined by an ROI engine 726.

The ROI engine 726 may receive the RGB rendered image 704 and the depth buffer information 714 to generate an ROI 728. As the RGB rendered image 704 may be generated based on a textured 3D mesh, pixels of the RGB rendered image 704 corresponding to points of the textured 3D mesh (e.g., portions of the textured 3D mesh visible in the RGB rendered image 704) may have corresponding depth information in the depth buffer information 714 and may be foreground pixels. Pixels of the RGB rendered image 704 which do not represent points of the textured 3D mesh may have an invalid or no depth information and may be background pixels. The ROI 728 may be defined as the foreground pixels. This may be expressed such that I is the RGB rendered image 704, d may be depth information and the ROI may be determined as for i∈[1, . . . , H]: for j∈[1, . . . , W]:

$$ROI_{ij} = \begin{cases} \text{Foreground}, & d_{ij} \geq 0 \\ \text{Background}, & d_{ij} = -1 \end{cases},$$

wherein i, j represent a pixel coordinate in I. In some cases, the ROI 728 may be passed to the geometry preservation loss engine 724 and the geometry preservation loss engine 724 may determine the geometry preservation loss for the ROI 728 (e.g., based on the ROI 728).

In some cases, within the ROI 728, not all pixels may contribute equally towards an expression variance. For example, it may be useful to pay more attention to portions of the ROI of the image corresponding to parts of the face that have more degrees of freedom, such as the lips and eyes. In some cases, an indication to pay more attention to a portion (e.g., pixels of the ROI) of the ROI of the image may be expressed as a loss weightage 730 where areas (e.g., portions, pixels, etc.) having more degrees of freedom are more highly weighted 732 as compared to areas having less degrees of freedom which are more lightly weighted 734. In some cases, the loss weightage may be determined by a loss weightage engine 736.

The loss weightage engine 736 may receive the ROI 728 along with one or more RGB rendered images 704. The loss weightage engine 736 may generate a loss weightage such that G~N (μ, σ), where μ is an average location of the facial parts having the highest degree of freedom across the RGB rendered images 704, where (represents a spatial resolution of the ROI, where N represents a Gaussian distribution with a mean μ and variance σ, and where G may be treated as a non-uniform weightage for the foreground pixels of ROI. Additionally, let $$I_x^{k,i} \text{ and } I_y^{k,i}$$

denote the x and y coordinates of the kth landmark of ith rendered frame, such that the degree of freedom for each landmark can be expressed as:

$$dof(k^{th} \text{ landmark}) = \max[\text{var}(I_x^{k,i}), \text{var}(I_y^{k,i})] \; \text{var}(I_x^{k,i}) = \frac{\sum_{i=1}^{T}\left(I_x^{k,i} - \frac{\sum_i I_x^{k,i}}{T}\right)^2}{T}.$$

Then μ may be set to the mean location of the landmark that has the highest degree of freedom and σ may be set to the standard deviation of the landmark having highest degree of freedom. In some cases, a landmark may be a vertex of a mesh representation associated with a distinctive and/or unique characteristic.

Figure 8:
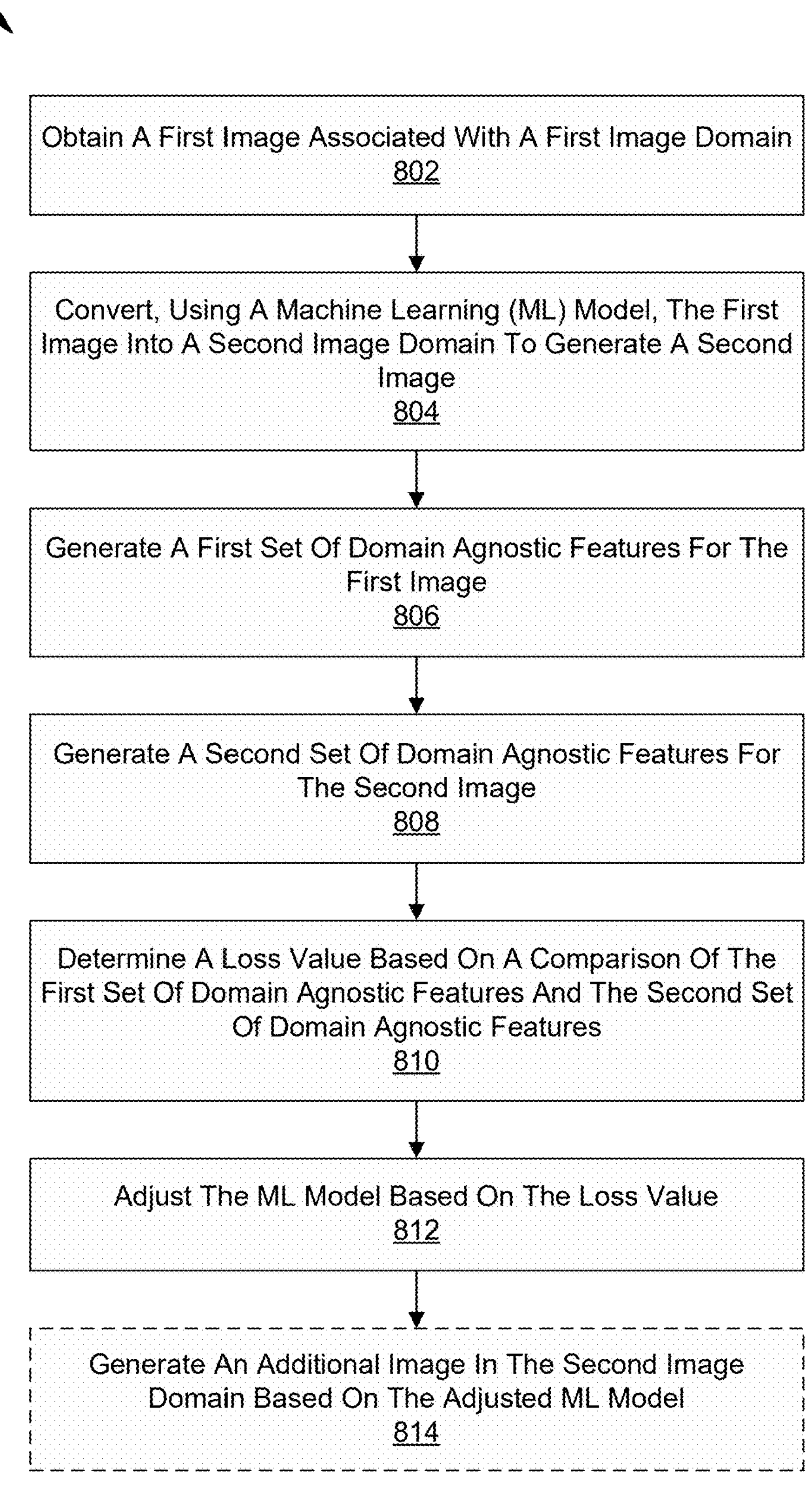
FIG. 8 is a flow diagram illustrating a process for generating an image, in accordance with aspects of the present disclosure.

FIG. 8 is a flow diagram illustrating a process 800 for generating a mesh model, in accordance with aspects of the present disclosure. The process 800 may be performed by a computing device (or apparatus) or a component (e.g., a chipset, codec, etc.) of the computing device, such as host processor 152 of FIG. 1, compute components 210 of FIG. 2, and/or processor 910 of FIG. 9. The computing device may be a mobile device (e.g., a mobile phone, mobile device), a network-connected wearable such as a watch, an extended reality (XR) device such as a virtual reality (VR) device or augmented reality (AR) device (e.g., HMD 510 of FIGS. 5A and 5B), a companion device, vehicle or component or system of a vehicle, or other type of computing device. The operations of the process 800 may be implemented as software components that are executed and run on one or more processors (e.g., host processor 152 of FIG. 1, compute components 210 of FIG. 2, and/or processor 910 of FIG. 9).

At block 802, the computing device (or component thereof) may obtain a first image (e.g., RGB rendered images 704 of FIG. 7). In some cases, the first image is associated with the first image domain. In some examples, the first image is rendered based on a 3D model. In some cases, the foreground is based on portions of the 3D model in the first image.

At block 804, the computing device (or component thereof) may convert, using the ML model (e.g., image domain converter 702 of FIG. 7), the first image into the second image domain to generate a second image (e.g., synthetic NIR images 716 of FIG. 7). In some cases, the first image domain includes a color image domain, and the second image domain includes an infrared image domain. In some examples, the infrared image domain includes a near-infrared (NIR) image domain.

At block 806, the computing device (or component thereof) may generate a first set of domain agnostic features (e.g., via domain agnostic feature engine 722 of FIG. 7) for the first image.

At block 808, the computing device (or component thereof) may generate a second set of domain agnostic features for the second image.

At block 810, the computing device (or component thereof) may determine a loss value (e.g., via geometry preservation loss engine 724 of FIG. 7) based on a comparison of the first set of domain agnostic features and the second set of domain agnostic features.

At block 812, the computing device (or component thereof) may adjust the ML model based on the loss value. In some cases, the computing device (or component thereof) may determine an adversarial loss value (e.g., via adversarial loss engine 720 of FIG. 7) based on a comparison between the second image and a third image (e.g., real NIR images 718 of FIG. 7). For example, the third image can include a real image captured using a sensor in the second image domain. The computing device (or component thereof) may adjust the ML model further based on the adversarial loss value. In some examples, the computing device (or component thereof) may determine a region of interest (ROI) (e.g., ROI 728 of FIG. 7) based on the first image. The loss value can be determined for the ROI. In some cases, the ROI is determined based on a foreground of the first image. In some examples, the computing device (or component thereof) may determine weights for pixels of the ROI. The loss value can be determined based on the weights. For example, portions of the ROI of the image may be expressed as a loss weightage. In some cases, the weights are determined based on a degree of freedom associated with a portion of the image corresponding to the pixels of the ROI. For example, areas (e.g., portions, pixels, etc.) having more degrees of freedom may be more highly weighted as compared to areas having less degrees of freedom.

In some aspects, the computing device (or component thereof) or a different computing device (or component thereof) can obtain the trained ML model (trained according to process 800) and can generate an additional image (e.g., a fourth image) in the second image domain based the adjusted/trained ML model. For example, the computing device (or component thereof) or the different computing device (or component thereof) can generate the additional image based on a fifth image in the first image domain using the trained ML model. In some cases, the computing device of the different computing device can include a camera that can capture the fifth image.

In some examples, the techniques or processes described herein may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 800 and/or other processes described herein may include a processor, microprocessor, micro-computer, or other component of a device that is configured to carry out the steps of the process 800 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 800 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Process 800 is illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 800 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some examples, computing system 900 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, camera, accelerometers, gyroscopes, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some examples, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Claim language or other language reciting "at least one processor configured to," "at least one processor being configured to," "a processor configured to," or the like indicates that one processor or multiple processors (in any combination) can perform the associated operation(s). For example, claim language reciting “at least one processor configured to: X, Y, and Z” means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting “at least one processor configured to: X, Y, and Z” can mean that any single processor may only perform at least a subset of operations X, Y, and Z.

Illustrative aspects of the present disclosure include:

Aspect 1. An apparatus for generating an image, comprising: at least one memory; and at least one processor coupled to the at least one memory, the at least one processor being configured to: obtain a first image, wherein the first image is associated with a first image domain; convert, using a machine learning (ML) model, the first image into a second image domain to generate a second image; generate a first set of domain agnostic features for the first image; generate a second set of domain agnostic features for the second image; determine a loss value based on a comparison of the first set of domain agnostic features and the second set of domain agnostic features; adjust the ML model based on the loss value; and generate a third image in the second image domain based on the adjusted ML model.

Aspect 2. The apparatus of Aspect 1, wherein the ML model is trained further based on: determine an adversarial loss value based on a comparison between the second image and a fourth image, wherein the fourth image comprises a real image captured using a sensor in the second image domain; and adjust the ML model further based on the adversarial loss value.

Aspect 3. The apparatus of any of Aspects 1 or 2, wherein training the ML model causes the ML model to determine a region of interest (ROI) based on the first image, and wherein the loss value is determined for the ROI.

Aspect 4. The apparatus of Aspect 3, wherein the ROI is determined based on a foreground of the first image.

Aspect 5. The apparatus of Aspect 4, wherein the first image is rendered based on a 3D model, and wherein the foreground is based on portions of the 3D model in the first image.

Aspect 6. The apparatus of any of Aspects 3 to 5, wherein training the ML model causes the ML model to determine weights for pixels of the ROI, and wherein the loss value is determined based on the weights.

Aspect 7. The apparatus of Aspect 6, wherein the weights are determined based on a degree of freedom associated with a portion of the image corresponding to the pixels of the ROI.

Aspect 8. The apparatus of any of Aspects 1 to 7, wherein the first image domain comprises a color image domain, and wherein the second image domain comprises an infrared image domain.

Aspect 9. The apparatus of Aspect 8, wherein the infrared image domain includes a near-infrared (NIR) image domain.

Aspect 10. The apparatus of any of Aspects 1 to 9, wherein the apparatus further comprises a camera for capturing a fifth image in the first image domain, wherein the third image is generated based on the fifth image using the adjusted ML model.

Aspect 11. A method for generating an image, comprising: obtaining a first image, wherein the first image is associated with a first image domain; converting, using a machine learning (ML) model, the first image into a second image domain to generate a second image; generating a first set of domain agnostic features for the first image; generating a second set of domain agnostic features for the second image; determining a loss value based on a comparison of the first set of domain agnostic features and the second set of domain agnostic features; adjusting the ML model based on the loss value; and generating a third image in the second image domain based on the adjusted ML model.

Aspect 12. The method of Aspect 11, further comprising: determining an adversarial loss value based on a comparison between the second image and a fourth image, wherein the fourth image comprises a real image captured using a sensor in the second image domain; and adjust the ML model further based on the adversarial loss value.

Aspect 13. The method of any of Aspects 11 or 12, further comprising determining a region of interest (ROI) based on the first image, and wherein the loss value is determined for the ROI.

Aspect 14. The method of Aspect 13, wherein the ROI is determined based on a foreground of the first image.

Aspect 15. The method of Aspect 14, wherein the first image is rendered based on a 3D model, and wherein the foreground is based on portions of the 3D model in the first image.

Aspect 16. The method of any of Aspects 13 to 15, further comprising determining weights for pixels of the ROI, and wherein the loss value is determined based on the weights.

Aspect 17. The method of Aspect 16, wherein the weights are determined based on a degree of freedom associated with a portion of the image corresponding to the pixels of the ROI.

Aspect 18. The method of any of Aspects 11 to 17, wherein the first image domain comprises a color image domain, and wherein the second image domain comprises an infrared image domain.

Aspect 19. The method of Aspect 18, wherein the infrared image domain includes a near-infrared (NIR) image domain.

Aspect 20. A non-transitory computer-readable medium having stored thereon instructions that, when executed by at least one processor, cause the at least one processor to: obtain a first image, wherein the first image is associated with a first image domain; convert, using a machine learning (ML) model, the first image into a second image domain to generate a second image; generate a first set of domain agnostic features for the first image; generate a second set of domain agnostic features for the second image; determine a loss value based on a comparison of the first set of domain agnostic features and the second set of domain agnostic features; adjust the ML model based on the loss value; and generate a third image in the second image domain based on the adjusted ML model.

Aspect 21. The non-transitory computer-readable medium of Aspect 20, wherein the instructions cause the at least one processor to perform operations according to any of Aspects 11-19.

Aspect 22. An apparatus for generating an image, comprising one or more means for performing operations according to any of Aspects 11-19.

What is claimed is:

1. An apparatus for generating an image, comprising:

at least one memory; and at least one processor coupled to the at least one memory, the at least one processor being configured to:

obtain a first image, wherein the first image is associated with a first image domain;

convert, using a machine learning (ML) model, the first image into a second image domain to generate a second image;

generate a first set of domain agnostic features for the first image;

generate a second set of domain agnostic features for the second image;

determine a loss value based on a comparison of the first set of domain agnostic features and the second set of domain agnostic features;

adjust the ML model based on the loss value; and generate a third image in the second image domain based on the adjusted ML model.

2. The apparatus of claim 1, wherein the ML model is trained further based on:

determine an adversarial loss value based on a comparison between the second image and a fourth image, wherein the fourth image comprises a real image captured using a sensor in the second image domain; and adjust the ML model further based on the adversarial loss value.

3. The apparatus of claim 1, wherein the at least one processor is configured to determine a region of interest (ROI) based on the first image, and wherein the loss value is determined for the ROI.

4. The apparatus of claim 3, wherein the ROI is determined based on a foreground of the first image.

5. The apparatus of claim 4, wherein the first image is rendered based on a 3D model, and wherein the foreground is based on portions of the 3D model in the first image.

6. The apparatus of claim 3, wherein training the ML model causes the ML model to determine weights for pixels of the ROI, and wherein the loss value is determined based on the weights.

7. The apparatus of claim 6, wherein the weights are determined based on a degree of freedom associated with a portion of the image corresponding to the pixels of the ROI.

8. The apparatus of claim 1, wherein the first image domain comprises a color image domain, and wherein the second image domain comprises an infrared image domain.

9. The apparatus of claim 8, wherein the infrared image domain includes a near-infrared (NIR) image domain.

10. The apparatus of claim 1, wherein the apparatus further comprises a camera for capturing a fifth image in the first image domain, wherein the third image is generated based on the fifth image using the adjusted ML model.

11. A method for generating an image, comprising:

obtaining a first image, wherein the first image is associated with a first image domain;

converting, using a machine learning (ML) model, the first image into a second image domain to generate a second image;

generating a first set of domain agnostic features for the first image;

generating a second set of domain agnostic features for the second image;

determining a loss value based on a comparison of the first set of domain agnostic features and the second set of domain agnostic features;

adjusting the ML model based on the loss value; and generating a third image in the second image domain based on the adjusted ML model.

12. The method of claim 11, further comprising:

determining an adversarial loss value based on a comparison between the second image and a fourth image, wherein the fourth image comprises a real image captured using a sensor in the second image domain; and adjusting the ML model further based on the adversarial loss value.

13. The method of claim 11, further comprising determining a region of interest (ROI) based on the first image, and wherein the loss value is determined for the ROI.

14. The method of claim 13, wherein the ROI is determined based on a foreground of the first image.

15. The method of claim 14, wherein the first image is rendered based on a 3D model, and wherein the foreground is based on portions of the 3D model in the first image.

16. The method of claim 13, further comprising determining weights for pixels of the ROI, and wherein the loss value is determined based on the weights.

17. The method of claim 16, wherein the weights are determined based on a degree of freedom associated with a portion of the image corresponding to the pixels of the ROI.

18. The method of claim 11, wherein the first image domain comprises a color image domain, and wherein the second image domain comprises an infrared image domain.

19. The method of claim 18, wherein the infrared image domain includes a near-infrared (NIR) image domain.

20. A non-transitory computer-readable medium having stored thereon instructions that, when executed by at least one processor, cause the at least one processor to:

obtain a first image, wherein the first image is associated with a first image domain;

convert, using a machine learning (ML) model, the first image into a second image domain to generate a second image;

generate a first set of domain agnostic features for the first image;

generate a second set of domain agnostic features for the second image;

determine a loss value based on a comparison of the first set of domain agnostic features and the second set of domain agnostic features;

adjust the ML model based on the loss value; and generate a third image in the second image domain based on the adjusted ML model.

* * * * *